United States Patent [19]

Engstrom

[11] Patent Number: 5,541,623
[45] Date of Patent: Jul. 30, 1996

[54] TEMPERATURE COMPENSATED OPTO-ELECTRONIC CIRCUIT AND MOUSE USING SAME

[75] Inventor: Keith A. Engstrom, Laguna Niguel, Calif.

[73] Assignee: Alps Electric (U.S.A.) Inc., San Jose, Calif.

[21] Appl. No.: 324,315

[22] Filed: Oct. 17, 1994

Related U.S. Application Data

[63] Continuation of Ser. No. 70,584, Jun. 2, 1993, abandoned.

[51] Int. Cl.$^6$ .................................................. C09G 1/00
[52] U.S. Cl. .......................... 345/165; 345/166; 250/238
[58] Field of Search .................................. 345/156, 157, 345/158, 163, 164, 165, 166; 250/214 A, 214 C, 205, 238, 231.13–231.18; 307/311, 355; 342/175

[56] References Cited

U.S. PATENT DOCUMENTS

| | | | |
|---|---|---|---|
| 3,699,649 | 10/1972 | McWilliams | 29/610 |
| 3,775,617 | 11/1973 | Dubauskas | 250/205 |
| 3,872,301 | 3/1975 | Joppich | 250/205 |
| 4,100,423 | 7/1978 | Krause | 250/214 A |
| 4,249,169 | 2/1981 | Malinowski | 340/630 |
| 4,284,872 | 8/1981 | Graeme | 219/121 LJ |
| 4,319,134 | 3/1982 | Weber | 250/231.16 |
| 4,328,419 | 5/1982 | Lefebvre | 250/214 R |
| 4,364,035 | 12/1982 | Kirsch | 340/710 |
| 4,381,441 | 4/1983 | Desmarais et al. | 219/121 LJ |
| 4,551,640 | 11/1985 | Fukuyama et al. | 307/311 |
| 4,626,822 | 12/1986 | Melkeraaen | 338/195 |
| 4,639,684 | 1/1987 | Laude | 330/259 |
| 4,647,906 | 3/1987 | Naylor et al. | 340/347 DA |
| 4,807,166 | 2/1989 | Zalenski | 340/710 |
| 4,947,169 | 8/1990 | Smith et al. | 341/121 |
| 4,951,034 | 8/1990 | Mazzone et al. | 340/710 |
| 4,975,386 | 12/1990 | Rao | 437/60 |
| 4,981,341 | 1/1991 | Brandle, Jr. et al. | 350/377 |
| 5,012,162 | 4/1991 | Chun | 315/309 |
| 5,046,859 | 9/1991 | Yamaguchi | 374/185 |
| 5,081,439 | 1/1992 | Natzle et al. | 338/195 |
| 5,124,596 | 6/1992 | Warcer | 307/571 |
| 5,138,280 | 8/1992 | Gingrich et al. | 330/295 |
| 5,146,100 | 9/1992 | Banaska | 307/311 |
| 5,221,928 | 6/1993 | Dahl | 342/205 |

FOREIGN PATENT DOCUMENTS

| | | | |
|---|---|---|---|
| 61-31409 | 7/1986 | Japan | G01D 5/36 |

OTHER PUBLICATIONS

Joseph J. Carr, How to Design and Build Electronic Instrumentation, 2nd Edition, 1986, pp. 143–147, 289–291.

*Primary Examiner*—Steven Saras
*Attorney, Agent, or Firm*—Guy W. Shoup; Patrick T. Bever

[57] ABSTRACT

A temperature compensated opto-electronic circuit structure including a emitter connected to one input of a comparator to provide a reference signal. A detector signal is applied to another input terminal of a comparator, and the output of the comparator is determined by a difference between the reference signal and the detector signal. As the temperature of the opto-electronic circuit increases and decreases, the reference signal is automatically adjusted due to the temperature-related forward voltage changes of the emitter.

5 Claims, 12 Drawing Sheets

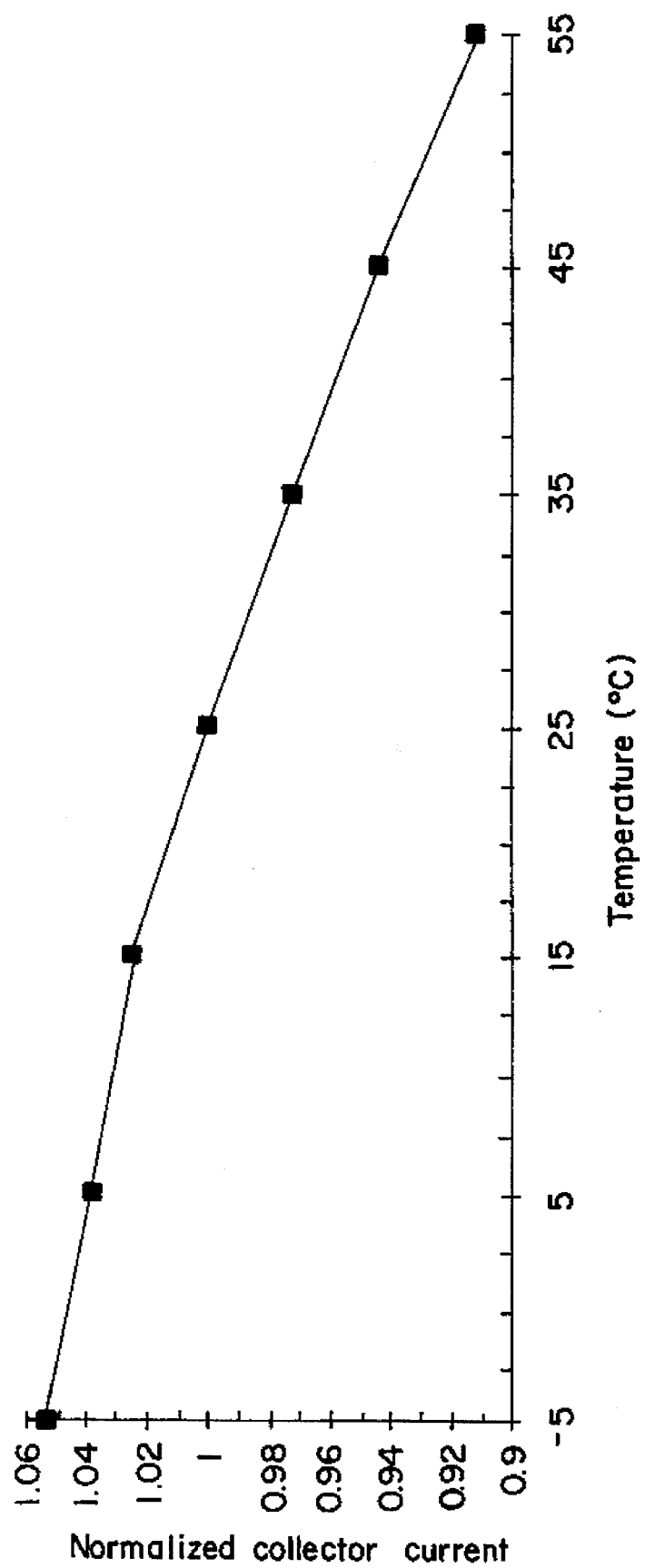

TEMPERATURE COMPENSATED OPTO-ELECTRONIC CIRCUIT AND MOUSE USING SAME

This application is a continuation of application Ser. No. 08/070,584, filed Jun. 2, 1993 now abandoned.

BACKGROUND OF THE INVENTION

1. Field of the Invention

The present invention is related to opto-electronic circuits and more particularly to temperature compensated opto-electronic circuits containing both an emitter and a detector.

2. Description of the Prior Art

The term "opto-electronics" typically refers to a general area of technology related to devices which emit, detect, or emit and detect electromagnetic (e/m) radiation in the visible, infrared, or ultraviolet spectral regions of the frequency spectrum.

FIG. 8 illustrates a simplified opto-electronic circuit 800 used, for example, in an opto-mechanical mouse. The opto-electronic circuit 800 includes a light emitting diode (LED) 810 for generating e/m radiation, a phototransistor 820 for receiving the e/m radiation, a comparator 840 for comparing a detector signal generated by the phototransistor 820 with a reference signal, and a power supply 850. The anode of the LED 810 is connected to the power supply 850 and the cathode is connected to ground through a load resistor 815. The collector of the phototransistor 820 is connected to the power supply 850. The emitter of the phototransistor 820 is connected both to the non-inverting input of the comparator 840 and to ground through a load resistor 825. Finally, a reference voltage is supplied to the inverting input of comparator 840 through a voltage divider 860 comprised of a first resistor 861 and a second resistor 862.

In operation, displacement of the opto-mechanical mouse relative to a fixed reference results in a rotation of an encoder 830 which is located between the LED 810 and the phototransistor 820. As the encoder 830 rotates, e/m radiation from the LED 810 passes through a plurality of openings formed on the encoder 830 and strikes the phototransistor 820 as a series of e/m pulses. Each e/m pulse causes the phototransistor 820 to turn on, thereby transmitting a high detector signal to the non-inverting input of the comparator 840. The frequency of the detector signal is directly proportional to the rotating speed of the encoder 830. The comparator 840 generates an OUTPUT signal having an amplitude which is determined by a difference between the detector signal and the reference voltage. The OUTPUT signal is typically used to control the position of a cursor on a video terminal screen.

A problem with the above-described opto-electronic circuit is that the detector signal varies inversely with ambient temperature. That is, as the temperature of the circuit decreases, the detector signal (voltage) applied to the non-inverting input of comparator 840 increases. Conversely, as the ambient temperature increases, the detector signal decreases. On the other hand, similar ambient temperature changes have little or no effect on the reference voltage. As a result, as the detector signal applied to the non-inverting input terminal of the comparator 840 varies with ambient temperature changes, the duty cycle of the comparator 840 is correspondingly changed.

FIG. 9 shows a typical temperature/current diagram associated with a silicon phototransistor in a prior art circuit. As indicated, the collector current decreases from 1.05 to 0.91 milliamps over a temperature change from −5° C. to 55° C., representing an approximate 14% variance.

FIGS. 10(a) to 10(d) illustrate the effect of temperature on the duty cycle of the comparator 840.

FIG. 10(a) shows a reference voltage and an ideal detector signal at a constant temperature. The 1 volt reference voltage 1010, represented as a horizontal line, is applied to the inverting input terminal of the comparator 840. The ideal detector signal 1020 generated by a constant rotation of the encoder 830 is shown as a solid sinusoidal wave. As shown, the ideal detector signal 1020 has a peak to peak amplitude of 2 volts, and swings about the 1 volt reference voltage.

FIG. 10(b) shows a square wave OUTPUT signal 1030 generated by the comparator 840 in response to the ideal detector signal 1020 and the reference voltage 1010 of FIG. 10(a). Because the peaks of the detector signal 1020 are symmetric about the reference voltage 1010, the OUTPUT signal 1030 generated by the comparator 840 has an ideal duty cycle of 50%.

FIGS. 10(c) and 10(d) show an effect of temperature variations on the OUTPUT signal generated by the comparator 840. Referring to FIG. 10(c), the reference voltage 1010 remains constant at 1 volt for all temperatures because the resistors 860 and 865 (FIG. 8) which produce the reference signal 1010 are not significantly effected by temperature variations. As the temperature decreases, a detector signal 1020(A) is generated by the phototransistor 820 which has a base (average) voltage shifted upward to 1.5 volts, and cycles between 0.5 and 2.5 volts.

FIG. 10(d) shows the duty cycle of the OUTPUT signal 1030(A) generated by the comparator 840 in response to the detector signal 1020(A). Because the detector signal 1020(A) is greater than the reference signal 1010 for an increased percentage of time due to the upward shift of the base voltage level of detector signal 1020(A), the duty cycle of the comparator 840 is increased correspondingly.

One prior art method of compensating for changes in the detector signal due to temperature variations is to replace one of the first resistor 861 or second resistor 862 of the voltage regulator 860 with a thermistor. The thermistor is used to adjust the reference signal to correspond with increases and decreases in the detector signal due to temperature variations, thereby normalizing the duty cycle of the comparator 840. However, this solution increased the cost of the circuit due to the cost of the thermistor.

SUMMARY OF THE INVENTION

The present invention is directed to a circuit structure and method which satisfy the need for a low-cost, highly reliable, temperature-compensated opto-electronic circuit.

An opto-electronic circuit structure according to the present invention includes an emitter, a detector and a comparator. One terminal of the emitter is connected to one input terminal of the comparator to provide a reference signal, and one terminal of the detector is connected to the other input terminal of the comparator to provide a detector signal. The comparator generates an output signal based on a difference between the reference signal and the detector signal. By connecting the emitter to one input of the comparator, a reference signal is provided which is automatically temperature-compensated, thereby reducing the variances in the detector signal caused by temperature variations without the need for a voltage regulator or a thermistor. Therefore, the opto-electronic circuit structure provides a simple and inexpensive means for generating a reference voltage whose amplitude varies in response to temperature changes.

An opto-mechanical mouse according to the present invention includes an opto-electronic circuit including a reference signal which is produced by connecting one terminal of an emitter to an input terminal of a comparator. A detector signal is connected to a second input terminal of the comparator. The opto-mechanical mouse improves over prior art temperature-compensated devices in that it provides a temperature-compensated input device while avoiding the cost of additional temperature compensating elements, such as thermistors or voltage dividers.

BRIEF DESCRIPTION OF THE DRAWINGS

These and other features, aspects, and advantages of the present invention will become better understood with regard to the following description, appended claims, and accompanying drawings where:

FIG. 9 shows a graph indicating a relationship between phototransistor collector current and temperature.

DESCRIPTION OF THE PREFERRED EMBODIMENT

Definitions

As used in the present application, the term "opto-electronic circuit" refers to a circuit which includes an electromagnetic radiation ("e/m") emitter, an e/m detector and a comparator. In addition, the term "opto-mechanical mouse" refers to a mouse-type computer input device incorporating an opto-electronic circuit.

General Description

Figure 1:
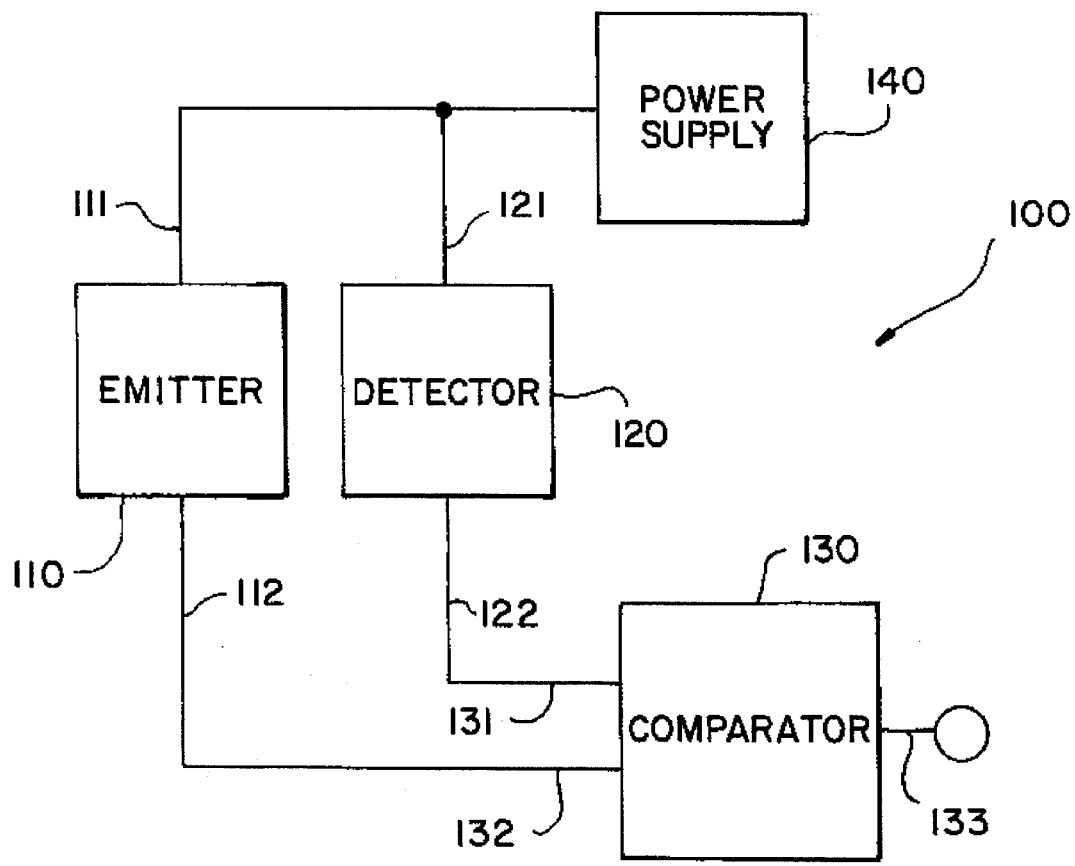
FIG. 1 shows a block diagram of a circuit according to the present invention.

As shown in FIG. 1, an opto-electronic circuit 100 in accordance with the present invention includes an emitter 110, a detector 120, a comparator 130 and a power supply 140. The opto-electronic circuit 100 is typically used in combination with an opaque member (not shown) disposed between the emitter 110 and the detector 120.

The emitter 110 includes a first terminal 111 connected to the power supply 140 and a second terminal 112 connected to the comparator 130. The emitter 110 generates e/m radiation in response to a current supplied by the power supply 140. The emitter 110 used in accordance with the present invention exhibits temperature-induced variable resistivity such that the resistance measured across the emitter 110 varies in an inverse relationship to ambient temperature variations. The emitter 110 is preferably a light emitting diode (LED). Further, the light emitter 110 preferably generates e/m radiation in the infra-red frequency spectrum, but may also generate e/m radiation in the visible light or ultraviolet frequency spectrums.

The detector 120 includes a first terminal 121 connected to the power supply 140 and a second terminal 122 connected to the comparator 130. The detector 120 generates a detector output signal on the second terminal 122 in response to the e/m radiation received from the emitter 110. The detector output signal is provided to the comparator 130. The detector 120 is preferably a silicon phototransistor which is responsive to the e/m radiation emitted from the emitter 110.

The comparator 130 includes a first input terminal 131 connected to the second terminal 122 of the detector 120 and a second input terminal 132 connected to the second terminal 112 of the emitter 110. The comparator 130 compares the detector signal and the reference signal and generates a comparator output signal on an output terminal 133. The comparator output signal has a first amplitude when the detector signal is greater than the reference signal, and a second amplitude when the detector signal is less than the reference signal. The comparator output signal is typically transmitted to a microprocessor or computer (not shown).

An opaque member (not shown) is movably positioned between the emitter 110 and the detector 120. The opaque member is typically used to translate a desired mechanical motion into electrical signals by preventing some or all of the e/m radiation emitted by the emitter 110 from striking the detector 120. For digital applications of the opto-electronic circuit 100, the opaque member can be an encoder wheel having a plurality of slots and spokes. For analog applications, the member can vary in opacity, or the member can be opaque and have a surface which blocks a portion of the e/m radiation in response to a proportional movement of a desired mechanical element.

The opto-electronic circuit 100 provides automatic temperature compensation by automatically adjusting the reference voltage due to the temperature-induced resistance change of the emitter 110. By selecting an emitter 110 exhibiting temperature-induced resistance changes which correspond to the temperature-induced output signal fluctuations of the detector 120, an opto-electronic device incorporating the present invention significantly reduces variations in comparator output signals due to temperature fluctuations without requiring a separate voltage divider or expensive temperature compensating circuitry.

A specific embodiment of the opto-electronic circuit according to the present invention will now be described as incorporated into an opto-mechanical mouse.

Opto-Mechanical Mouse

Figure 2:
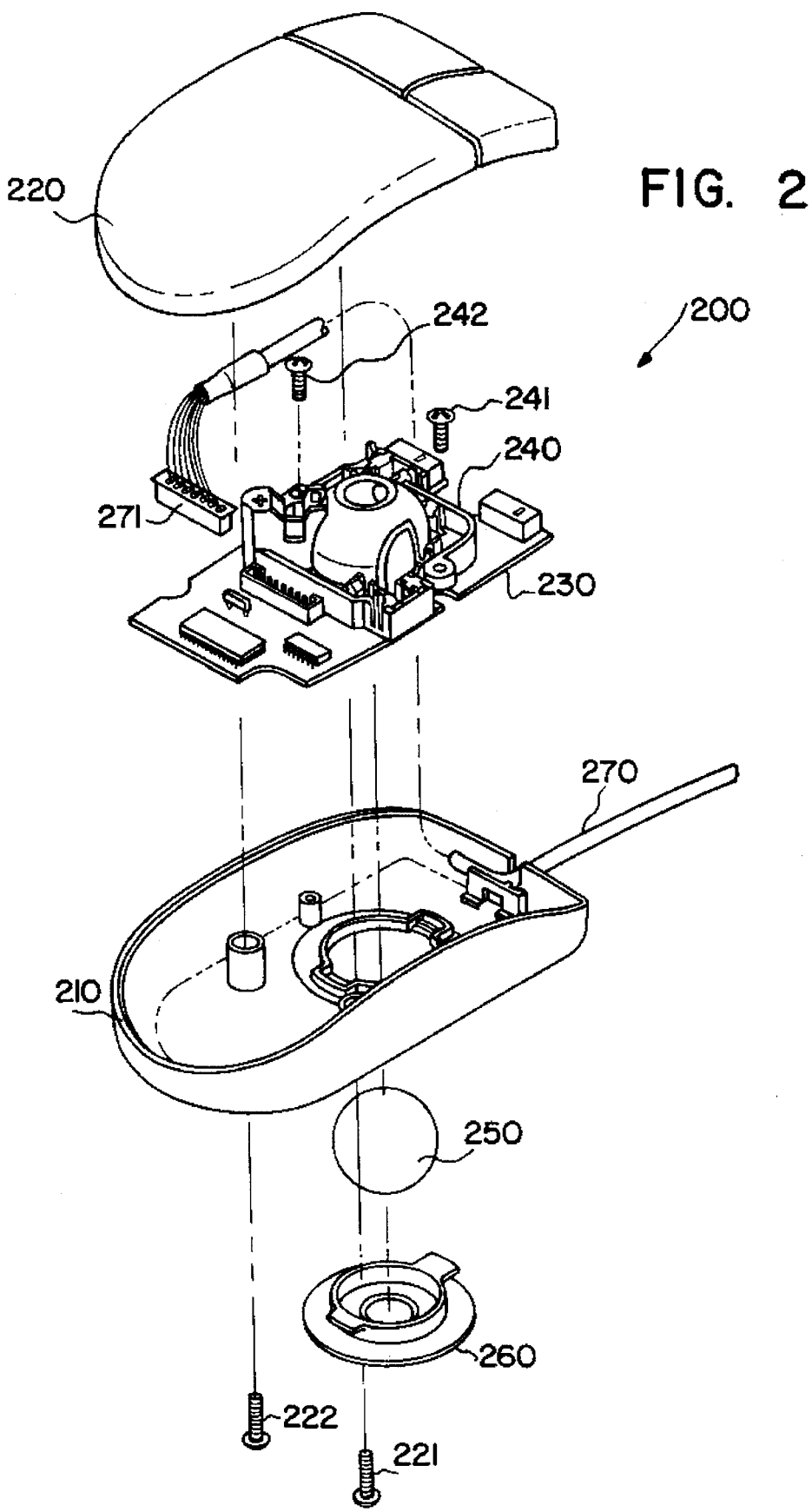
FIG. 2 shows an exploded view of an opto-electronic mouse incorporating the present invention.
Figure 3:
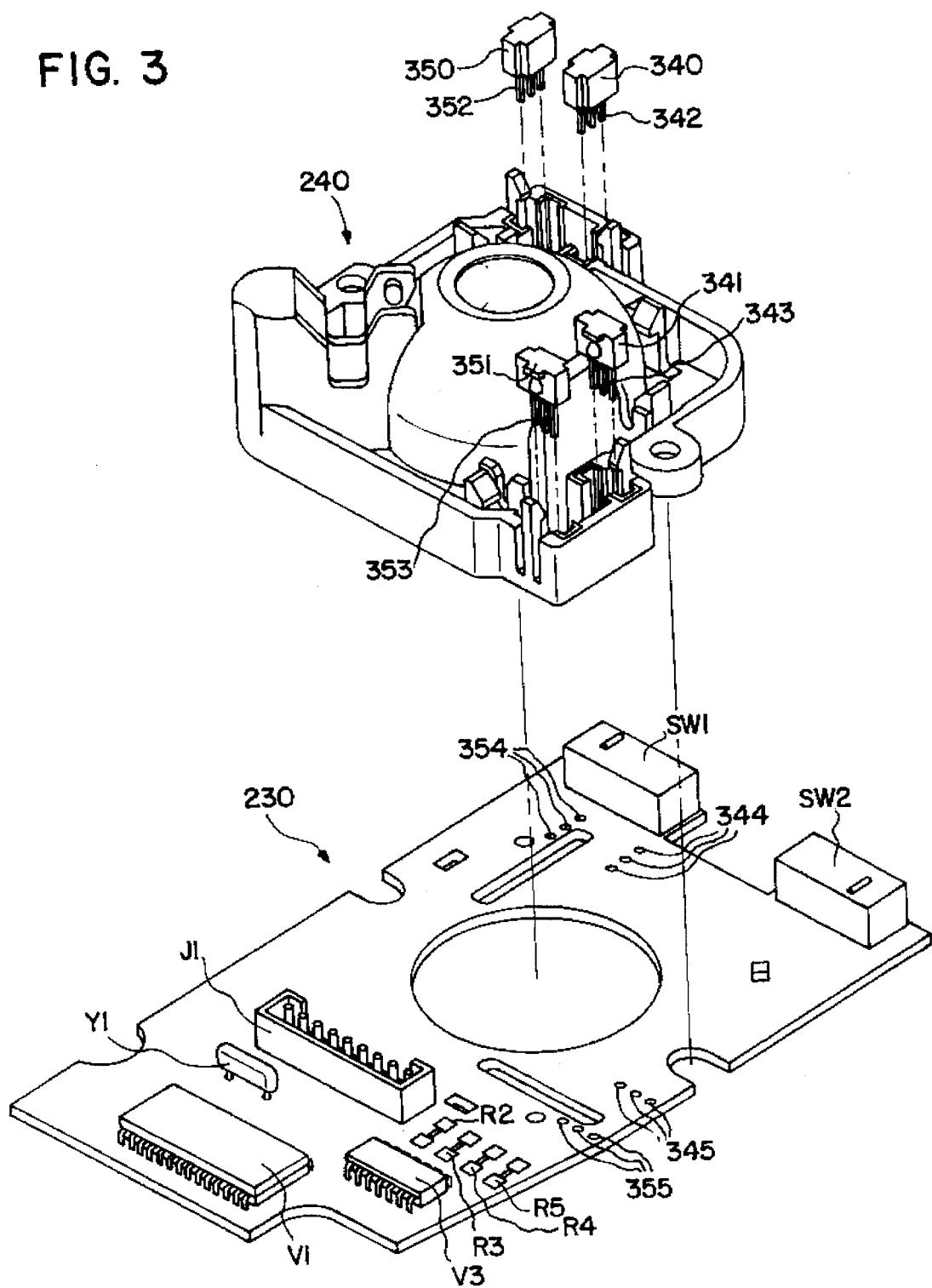
FIG. 3 shows a partial exploded view of a printed circuit board and a chassis of FIG. 2.

FIGS. 2 and 3 show an opto-mechanical mouse 200 incorporating the opto-electronic circuit according to the present invention. The opto-mechanical mouse 200 is described in additional detail in co-pending, commonly-assigned U.S. application Ser. No. 08/071,437, entitled "Opto-Mechanical Mouse", filed on the 2nd day of Jun. 1993. [Attorney Docket No. AUI-25], which is incorporated herein by reference in its entirety.

As shown in FIG. 2, an opto-mechanical mouse 200 includes a housing comprised of a base 210, a cover 220 fixedly connected to the base 210 by fasteners 221 and 222, and a ball retaining cap 260 which is connected to the base 210. A printed circuit board (PCB) 230 is located on mounts formed on the base 210. A chassis 240 is snap coupled to the PCB 230 and is fixedly connected to the base 210 by fasteners 241 and 242. A ball 250 is rotatably housed in the chassis 240 and retained by the ball retaining cap 260. Finally, a cable 270, having a first end connected to a host computer (not shown), is connected to the PCB 230 by a plug 271.

PCB Description

Figure 4A:
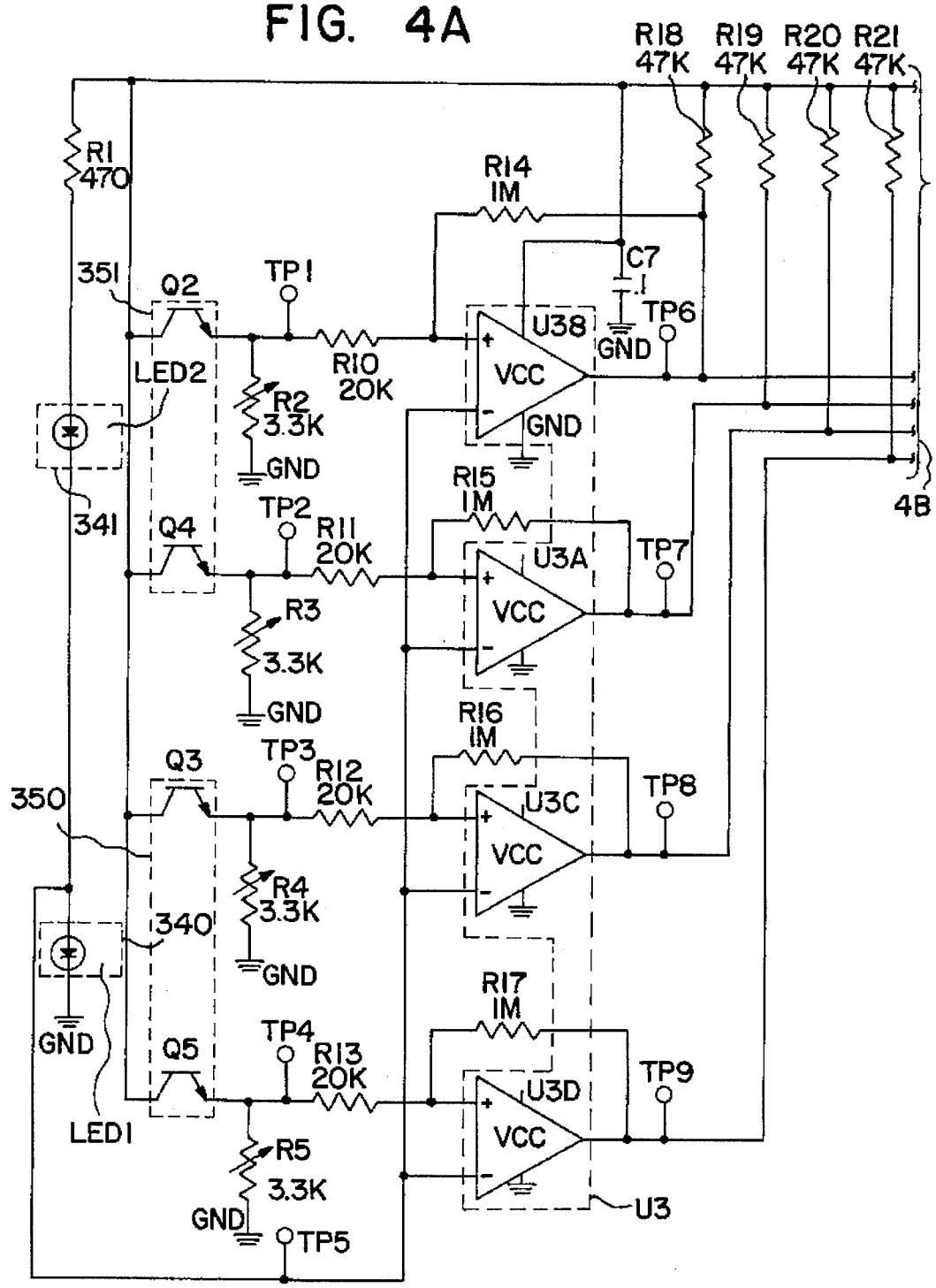
FIGS. 4A and 4B show a wiring diagram of the printed circuit board of FIG. 2.
Figure 4B:
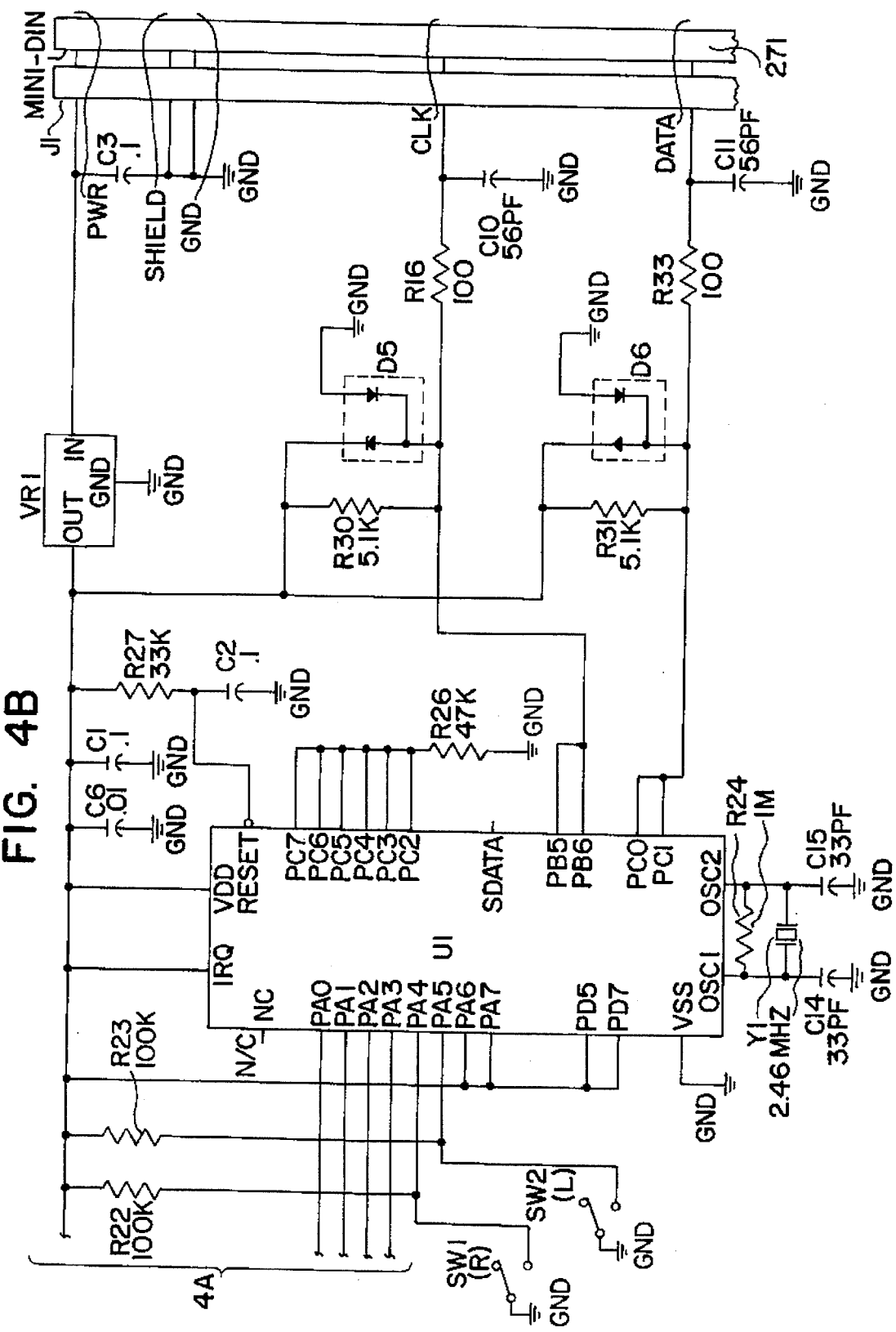

FIG. 3 shows an exploded view of the PCB 230 and the chassis 240. Connected to the PCB 230 are a microprocessor integrated circuit ("IC") U1, a comparator IC U3, a crystal Y1, a cable connector socket J1, first and second switches SW1 and SW2, and a plurality of laser trimmable resistors R2, R3, R4 and R5. Emitter units 340 and 341 are mounted on chassis 240, each having a plurality of leads 342 and 343 extending through a lower surface of the chassis 240 and inserted into holes 344 and 345 formed in the PCB 230. Similarly, detector units 350 and 351 are mounted on chassis 240, each having a plurality of leads 352 and 353 extending through a lower surface of the chassis 240 and inserted into the holes 354 and 355 formed in the PCB 230. Additional holes and slots are formed in the PCB 230 for receiving the chassis 240. The holes and slots are described in greater detail in the above-mentioned co-pending application. Finally, a circuit pattern (not shown) is formed on the surfaces of the PCB 230 for providing electrical connection paths between the above-mentioned electrical components. FIGS. 4A and 4B show a circuit diagram indicating the connection paths associated with the circuit pattern.

Circuit Diagram (FIGS. 4A and 4B)

FIGS. 4A and 4B show a circuit diagram the PCB 230 and associated circuitry as configured to operate in association with an IBM PS/2 computer or equivalent.

As shown in FIG. 4B, the plug 271 of the cable 270 connects to the socket J1, which is connected to the PCB 230. The cable 270 includes five lines: PWR (power), SHIELD, GND (ground), CLK (clock) and DATA.

The PWR line provides 5.0±5% volts to the mouse from a host computer (not shown) and is connected through a capacitor C3 to the SHIELD line and the GND line. The capacitor C3 is selected to remove transients from the power supply. The PWR line is also connected to an input terminal of a voltage regulator VR1.

The voltage regulator VR1 receives the 5.0±5% volts from the host computer and generates a 4.0 volt DC supply at its output terminal which is provided to the remaining circuitry associated with the PCB 230. A preferred voltage regulator VR1 is model number JRC 7201U40 available from New Japan Radio Co., Ltd., of Tokyo, Japan.

The SHIELD line is connected to the shield of the coaxial cable 270 and is connected through the capacitor C3 to the PWR line.

The CLK line provides a clock signal from the host computer which is connected to the clock-in terminal (PB5) and the clock-out terminal (PB6) of microprocessor U1. The CLK line is connected to ground through a capacitor C10 which is selected to remove transients from the clock signal. The CLK line is also connected to the output terminal of voltage regulator VR1 through a resistor R30 connected in parallel with a diode pair D5. The resistor R30 is selected to maintain the CLK line at a minimum voltage of 3.5 volts. The diode pair D5 suppresses transients which are 0.7 volts above the output of VR1 and 0.7 volts below ground. The clock signal is used to synchronize data output signals from the microprocessor U1. The clock signal is typically 0 to 5 volts at 1200 Hz.

The DATA line transmits a input and output data signals to and from the microprocessor U1 and is connected to the data-in terminal (PC0) and the data-out terminal (PC1) of the microprocessor U1. The input data signals sent to the microprocessor U1 from an external computer (not shown) include reset, resend, set default, disable, enable, set sampling rate, read device type, set remote mode, set wrap mode, reset wrap mode, set scaling, reset scaling and set resolution. The DATA line is connected to ground through a capacitor C11 which is selected to remove transients from the data signal. The DATA line is also connected to the output terminal of voltage regulator VR1 through a resistor R31 connected in parallel with a diode pair D6. The resistor R31 is selected to maintain the DATA line at a minimum voltage of 3.5 volts. The diode pair D6 suppresses transients which are 0.7 volts above the output of VR1 and 0.7 volts below ground. The data signal is transmitted on the DATA line to the host computer and is used to control the position of a cursor on a video terminal and to indicate the depressed/undepressed state of the switches SW1 and SW2.

A pair of capacitors C1 and C6 are connected between the output terminal of the voltage regulator VR1 and ground to remove transients from the source voltage signal, thereby further assuring that a consistent 4.0 volts is transmitted to the circuitry associated with the PCB 230.

The microprocessor U1 is preferably a model number 68HC05P1 microprocessor available from Motorola, Inc. of Schamberg, Ill. The operating parameters of a 68HC05P1 microprocessor are taught in "Motorola Microprocessors, Microcontrollers and Peripheral Data", Vol II Series A (1988), which is available from Motorola and is incorporated herein by reference.

The source voltage generated by voltage regulator VR1 is applied directly to the IRQ, VDD, PA6, PA7, PD5 and PD7 terminals of the microprocessor U1, thereby maintaining a "high" signal on these terminals whenever power is supplied to the opto-mechanical mouse 200 from the host computer. In addition, the source voltage is applied to the inverting RESET terminal of the microprocessor U1 through a resistor/capacitor (RC)network including resistor R27 and capacitor C2. The RC network R27/C2 applies a "low" reset signal to the microprocessor U1 upon start-up and a "high" reset signal thereafter. The capacitor C2 is connected between the resistor R27 to provide the RC time constant to generate the reset pulse.

The remaining terminals of the microprocessor U1 are either connected to ground or allowed to float. The output terminal SDATA is floating. Terminal VSS is connected directly to ground, and terminals PC7, PC6, PC5, PC4, PC3 and PC2 are connected to ground through a 47 KΩresistor R26.

Switches SW1 and SW2 are normally-open push-button switches, each having a fixed terminal connected to the PA4 and PA5 input terminals, respectively, of microprocessor U1. The source voltage generated by voltage regulator VR1 is connected to the fixed terminals of switches SW1 and SW2 and to the PA4 and PA5 input terminals through pull-up resistors R22 and R23. A "high" signal is maintained at the PA4 and PA5 input terminals until either or both of the switches SW1 and SW2 are acutated by a user. When actuated, switches SW1 and SW2 connect the PA4 and PA5 input terminals, respectively, to ground, thus producing a "low" signal.

The crystal Y1 is connected in parallel across terminals OSC1 and OSC2 along with a resistor R24. In addition, each terminal of the crystal Y1 is connected to ground through capacitors C14 and C15, respectively. The crystal Y1, resistor R24 and capacitors C14 and C15 are selected to produce a 1.23 MHz internal clock signal in the microprocessor U1.

Referring to FIG. 4A, the source voltage from voltage regulator VR1 is connected through a resistor R1 to the anode of LED2, which is disposed within emitter unit 341. The cathode of LED2 is connected to the anode of LED1, which is disposed within emitter unit 340. The cathode of LED1 is connected to ground. The cathode of LED2 is also connected to the inverting inputs of four comparators U3A, U3B, U3C and U3D, all of which located in comparator IC U3. As noted above in the explanation of the circuit 100 of FIG. 1, the emitters should have a temperature-induced forward voltage drop which is inversely proportional to the ambient temperature. Suitable LEDs for practicing the present invention are provided by Siemens of Germany under LED die number FU94K.

The source voltage is also connected to the collectors of phototransistors Q2 and Q4, which are mounted in the detector unit 351, and to the collectors of phototransistors Q3 and Q5, which are mounted in the detector unit 350. The emitters of phototransistors Q2 and Q4 are connected to the non-inverting inputs of comparators U3A and U3B through resistors R10 and R11, respectively, and to ground through adjustable (trimmable) resistors R2 and R3, respectively. The emitters of phototransistors Q3 and Q5 are connected to the non-inverting inputs of comparators U3C and U3D through resistors R12 and R13, respectively, and to ground through adjustable (trimmable) resistors R4 and R5, respectively.

Each resistor pair consisting of resistor R10 and adjustable resistor R2, resistor R11 and adjustable resistor R3, resistor R12 and adjustable resistor R4, and resistor R13 and adjustable resistor R5, is selected and adjusted to apply a detector signal to the non-inverting input of the comparators U3A through U3D, respectively. Each detector signal has an average amplitude preferrably within the range of 0.3 to 1.2 volts. The resistance of the adjustable resistors R2, R3, R4 and R5 are adjusted such that the duty cycles of the comparators U3A through U3D are approximately 50%. Adjustment of the adjustable resistors R2 through R5 is discussed in co-pending, commonly assigned U.S. application Ser. No. 8/071,152, entitled "Laser-Trimming Method for Producing Opto-Electric Circuit", filed on the 2nd day of Jun., 1993. [Attorney Docket No. AUI-24], which is incorporated herein by reference in its entirety.

Comparator IC U3 is preferably a model NJM2901 available from New Japan Radio Co., Ltd. The operating parameters of a model NJM2901 comparator IC are described in the "New Japan Radio Company Semiconductor Data Book, Bipolar I.C." (1990) which is incorporated herein by reference. The VCC input terminal of the comparator IC U3 is connected to receive the source voltage provided by voltage regulator VR1, and also connected to ground through a capacitor C7 which is selected to filter transients. For circuit simplification, the VCC connection is illustrated only in U3B. The output terminal of comparator U3B is connected to the source voltage through a pull-up resistor R18 and is fed-back to the non-inverting input through resistor R14, which in combination with resistor R10 forms a Schmitt trigger. Similarly, the output terminal of comparator U3A is connected to the source voltage through a pull-up resistor R19 and is fed-back to its non-inverting input through resistor R15. Likewise, the output terminal of comparator U3C is connected to the source voltage through a pull-up resistor R20 and is fed-back to its non-inverting input through resistor R16, and the output terminal of comparator U3D is connected to the source voltage through a pull-up resistor R21 and is fed-back to its non-inverting input through resistor R17. The above-mentioned resistors are selected such that the Schmitt triggers provide a hysteresis effect, preferably within a range of 1 to 5%, to allow for electrical noise and mechanical vibration.

Operation

When activated, the opto-electronic mouse device 200 receives power and clock signals from a host computer (not shown) over cable 270. The power supply is applied to the input terminal voltage regulator VR1, which in turn provides a 4.0 volt source voltage on its output terminal. The RC network R27/C2 causes a low signal to be applied to the RESET terminal of the microprocessor U1, thereby causing the microprocessor U1 to be reset.

Once the microprocessor U1 is reset, the mouse device 200 applies a clock signal to the clock-in and clock-out terminals. In addition, the microprocessor U1 transmits a diagnostics "AA" and "00" (hexidecimal) signal to the host computer (not shown), and the host computer sends an enable command back to the microprocessor U1.

Mechanical movements of the opto-mechanical mouse 200 are converted into data signals as follows.

Figure 5:
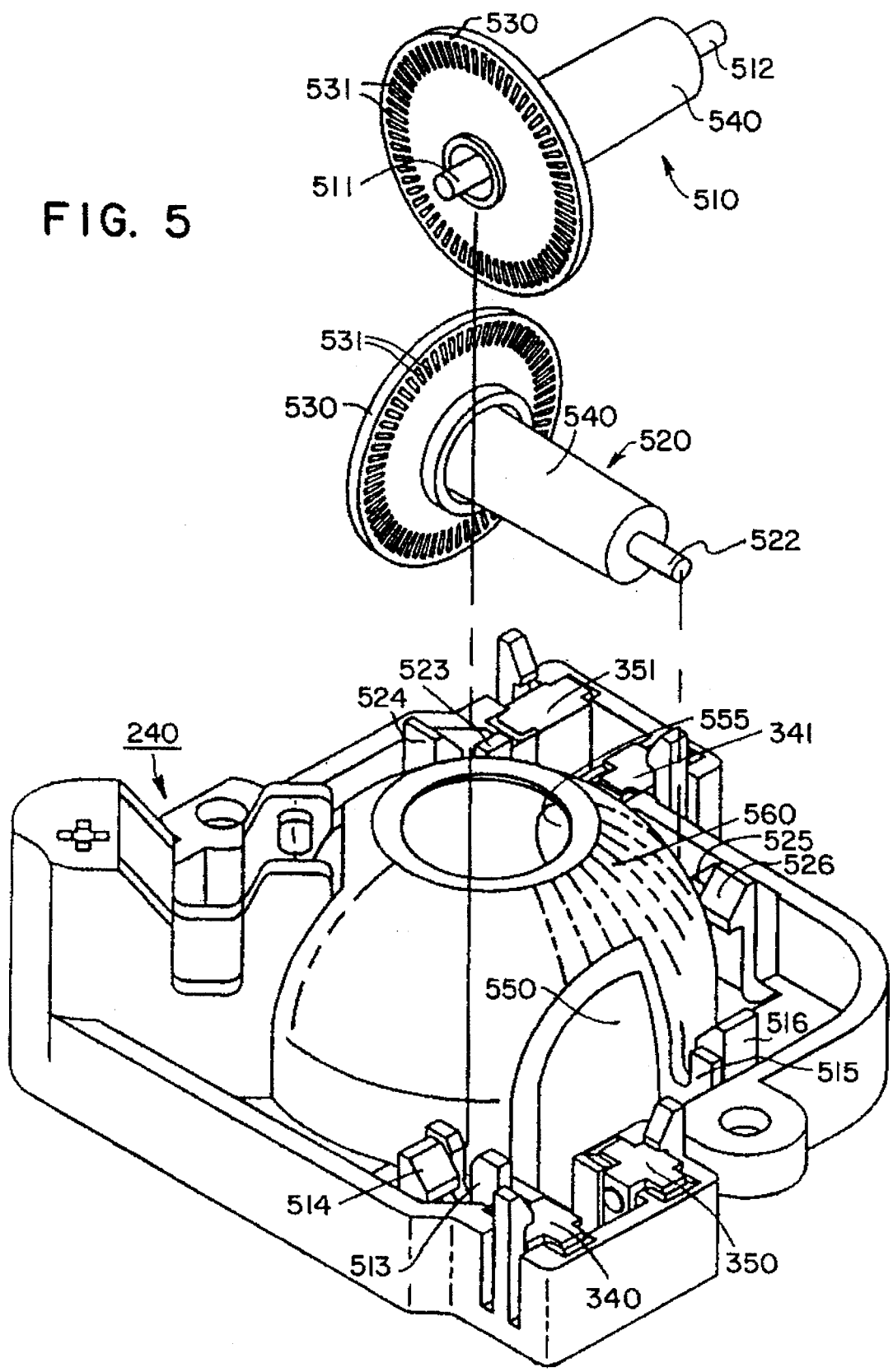
FIG. 5 shows an exploded perspective view of the chassis of FIG. 3 indicating the mounting positions of a pair of encoders.

FIG. 5 shows an exploded perspective view of the chassis 240 indicating the position of a first encoder 510 between the first emitter unit 340 and first detector unit 350, and the position of a second encoder 520 between the second emitter unit 341 and the second detector unit 351. The first encoder 510 includes first and second journals 511 and 512, the first journal 511 being rotatably supported on the first encoder mount 513 and secured by a first encoder latch 514, and the second journal 512 being rotatably supported on the second encoder mount 515 and secured by a second encoder latch 516. Similarly, the second encoder 520 includes first and second journals 521 (not shown) and 522, the first journal 521 being rotatably supported on the first encoder mount 523 and secured by a first encoder latch 524, and the second journal 522 being rotatably supported on the second encoder mount 525 and secured by a second encoder latch 526. The first and second encoders 510 and 520 include a code disk 530 located adjacent the first journals 511 and 521, and a roller portion 540 located adjacent the second journals 512 and 522. The code disk 530 is formed with a plurality of elongated openings 531 which extend radially with respect to the axes of the first and second encoders 510 and 520.

When the opto-mechanical mouse 200 is fully assembled, the ball 250 is pressed against the roller portions 540 of the first and second encoders through openings 550 and 555 formed in a ball housing 560 of the chassis 240. A portion of the ball 250 also extends through a hole in the ball retaining member 260. When the opto-mechanical mouse is moved over a flat surface, the X-and Y-direction movements of the mouse cause the ball 250 to rotate in directions which are transferred to the roller portions 540 of the first and second encoders 510 and 520. The rotation of the first and second encoders 510 and 520 causes the code disks 530 to rotate, thereby allowing intermittent pulses of e/m radiation emitted by the emitters LED1 and LED2 of the first and second emitter units 340 and 341 to pass through the openings 550 and 555 and to strike the detectors Q2 through Q5 located on first and second detector units 350 and 351. As the e/m radiation pulses strike the detectors, the detectors generate detector currents which are applied to the PA0, PA1, PA2 and PA3 terminals of the microprocessor U1. The microprocessor U1 then converts the detector signals into data-signals which are sent to the host computer over the DATA line. Note that the direction of rotation of the first and second encoders 510 and 520 is determined by the phase difference between the phototransistors Q2 and Q4, and between the phototransistors Q3 and Q5, respectively.

Similarly, activation of the switches SW1 and SW2 by a user causes low switch signals to be applied to the PBD and SBD terminals of the microprocessor U1, which in turn generates data signals on the DATA line indicating the event.

Figure 6:
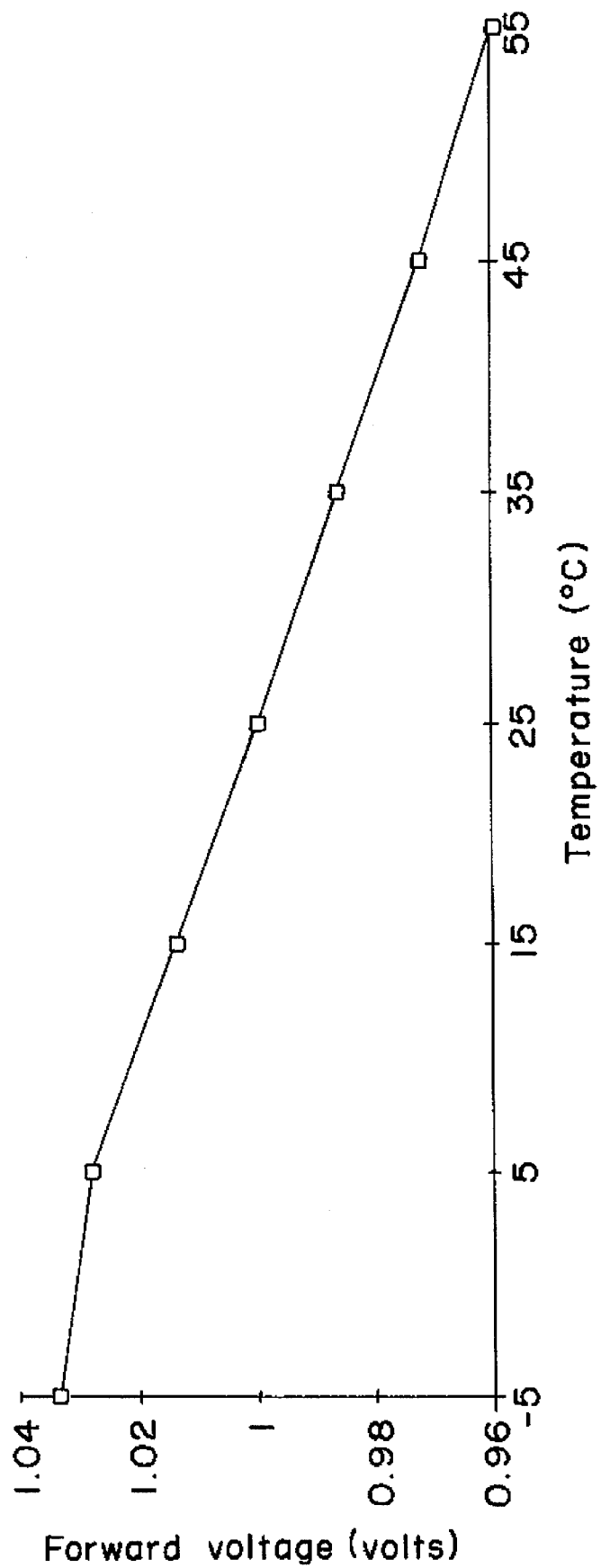
FIG. 6 shows a graph indicating a relationship between LED forward voltage and temperature.
Figure 7:
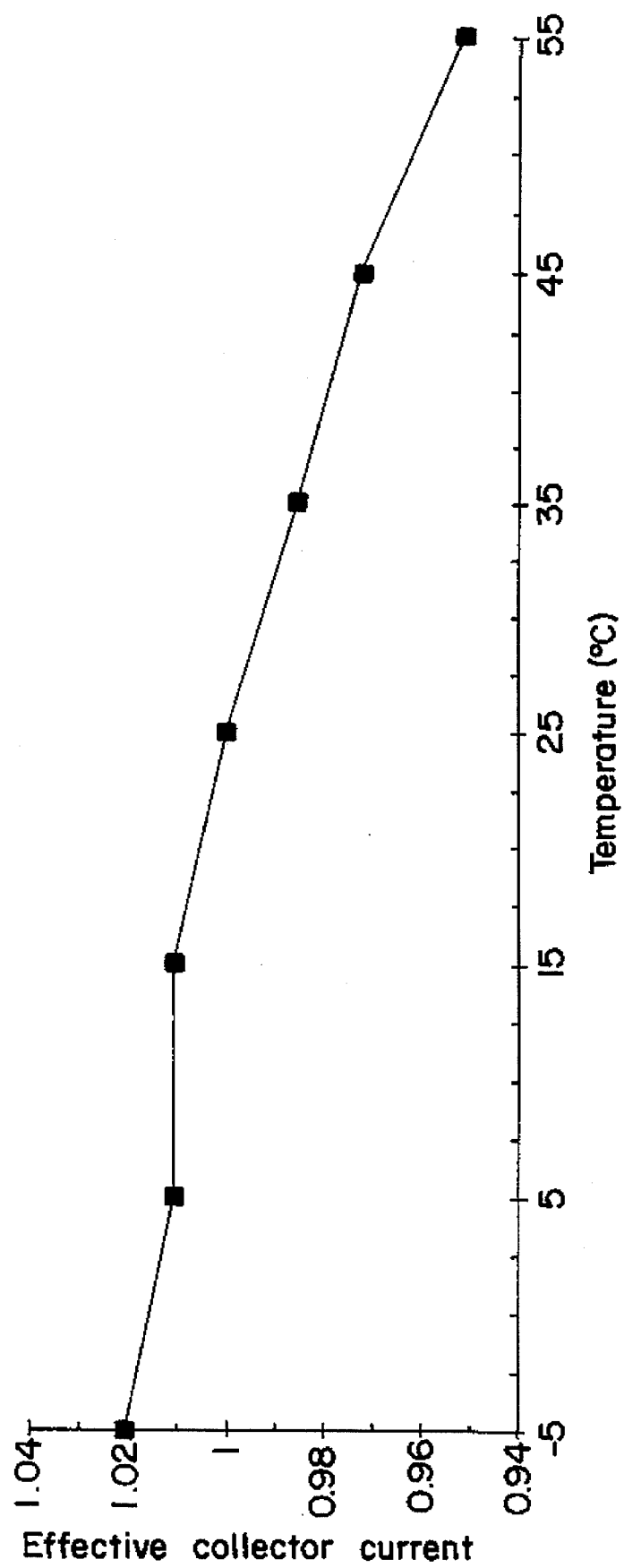
FIG. 7 shows a graph indicating a detector signal generated by an opto-electronic circuit incorporating the present invention.
Figure 8:
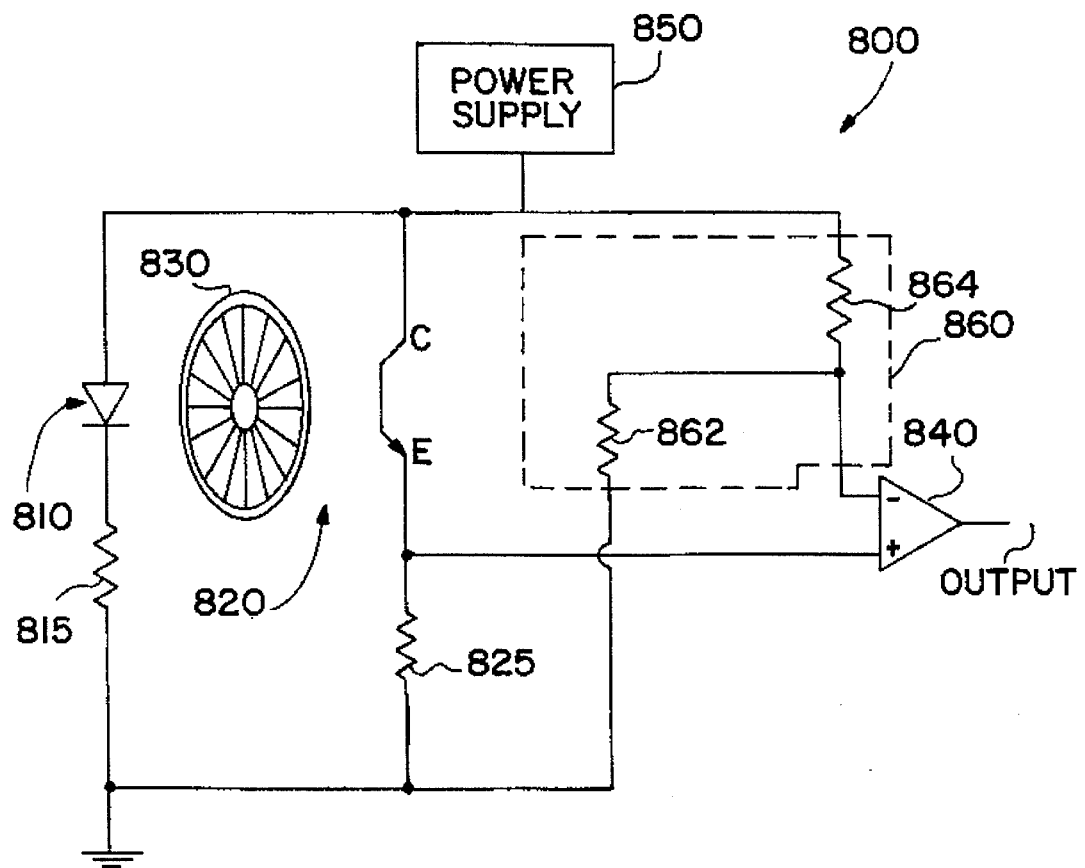
FIG. 8 shows a prior art simplified circuit diagram of an opto-electronic device.
Figure 10A:
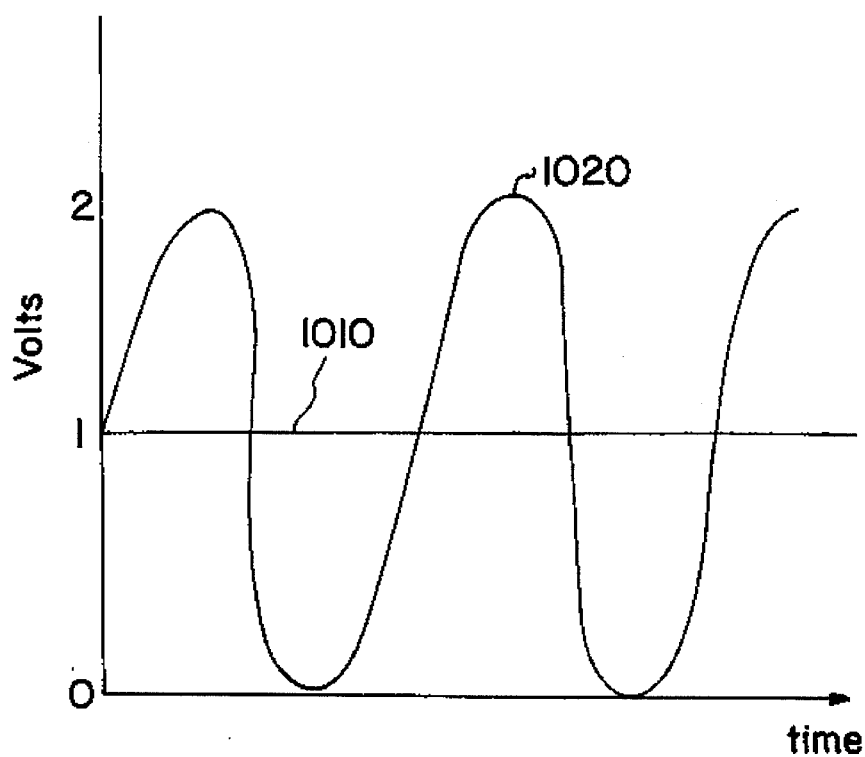
FIGS. 10(a) through 10(d) show signal diagrams indicating the effect of temperature on the performance of a prior art opto-electronic circuit.
Figure 10B:
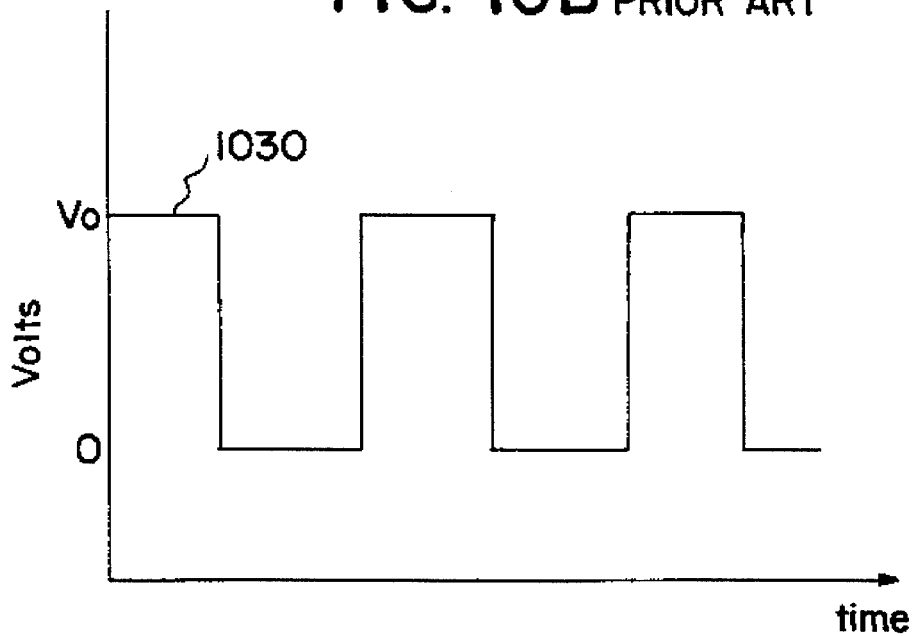
Figure 10:
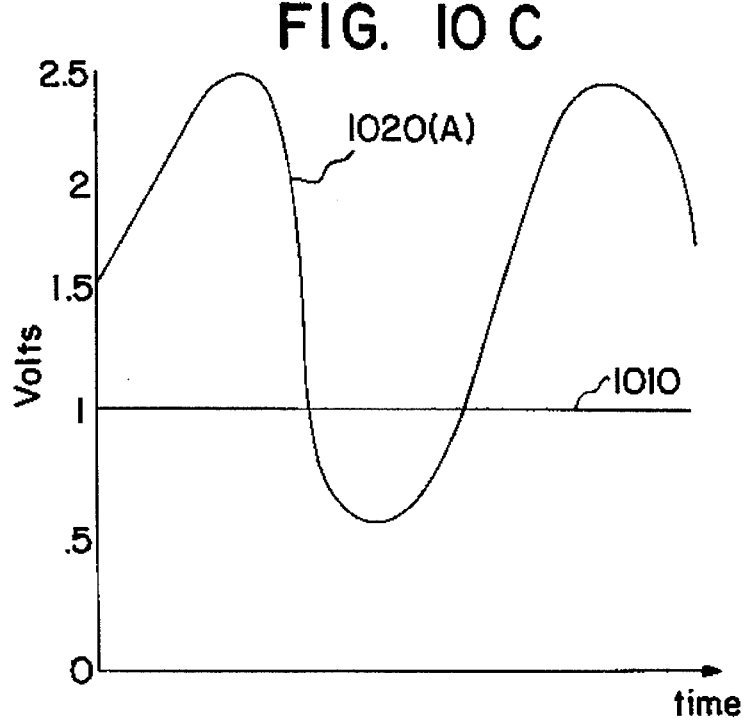
Figure 10:
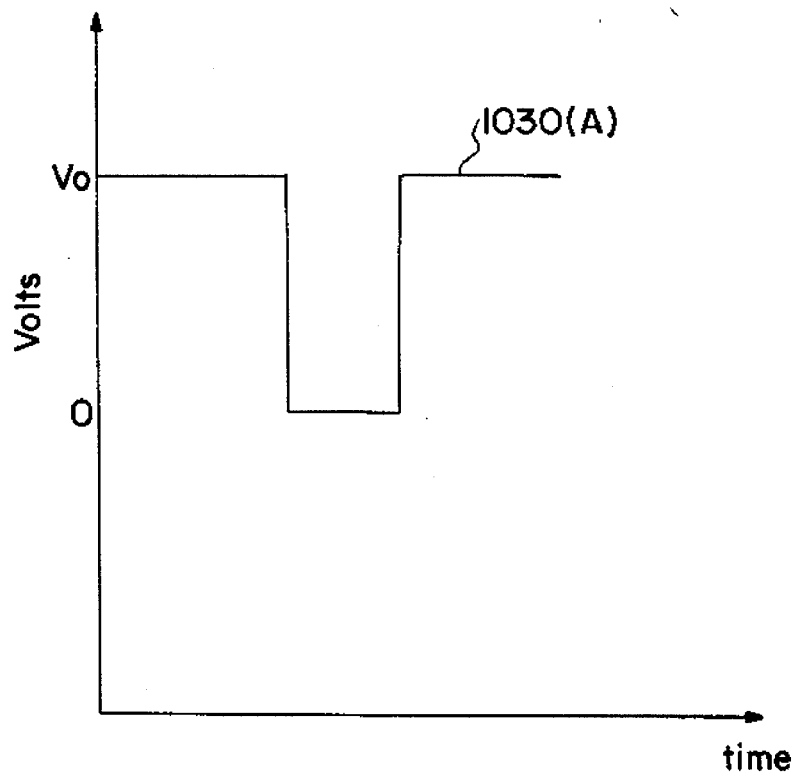

Temperature variations of the opto-mechanical mouse are compensated for by the opto-electronic circuit of the present invention as indicated in FIGS. 6 and 7.

FIG. 6 shows a diagram indicating a voltage measured across LED1 for temperatures ranging from −5° C. to 55° C. Note that the voltage across the LED decreases along a curve which is similar to the current/temperature curve associated with the prior art circuit, shown in FIG. 9.

FIG. 7 shows the normalized collector current of one of the phototransistors Q2 through Q5 over the temperature range of −5° C. to 55° C. Note that the current decreases from 1.03 to 0.96 milliamps over the temperature range, indicating an approximately 7% variance. As compared to the effective collector current indicated in FIG. 9, the present invention decreases the amount of variance due to temperature change by approximately 50%. In addition, this 50% improvement is provided without a voltage divider or thermistor, as required in the prior art, thereby providing temperature compensation while reducing the cost of the circuit.

Although the present invention has been described in considerable detail with reference to certain preferred embodiments thereof, other embodiments are possible. For example, the opto-electronic circuit can be used in electro-medical monitor devices or other devices subjected to changes in operating temperature. Therefore, the spirit and scope of the appended claims should not be limited to the description of the preferred embodiments contained herein.

I claim:

1. An opto-mechanical input device for entering control information into a computer, the input device comprising:

a first emitter for emitting electromagnetic radiation, said first emitter connected between a power source and a first node;

a second emitter for emitting electromagnetic radiation, said second emitter connected between the first node and ground;

a first detector for detecting said emitted electromagnetic radiation from said first emitter and for generating a first detector signal;

a second detector for detecting said emitted electromagnetic radiation from said second emitter and for generating a second detector signal;

a first comparator having a first terminal connected to said first node and a second terminal connected to receive said first detector signal, said first comparator generating a first output signal in response to a difference between the first detector signal and a reference signal received at the first terminal from the first node; and a second comparator having a third terminal connected to said first node and a fourth terminal connected to receive said second detector signal, said second comparator generating a second output signal in response to a difference between the second detector signal and the reference signal received at the second terminal from the first node.

2. The opto-mechanical input device of claim 1 further comprising:

a first conductor for transmitting the first detector signal from the first detector to the first comparator;

a first adjustable resistor connected between the first conductor and ground;

a second conductor for transmitting the second detector signal from the second detector to the second comparator; and a second adjustable resistor connected between the second conductor and ground.

3. The opto-mechanical input device of claim 2 wherein the first and second adjustable resistors are laser trimmable resistors.

4. The opto-mechanical input device of claim 1 further comprising:

a third detector for detecting said emitted electromagnetic radiation from said first emitter and for generating a third detector signal;

a fourth detector for detecting said emitted electromagnetic radiation from said second emitter and for generating a fourth detector signal;

a third comparator having a fifth terminal connected to said first node and a sixth terminal connected to receive said third detector signal, said third comparator generating a third output signal in response to a difference between the third detector signal and the reference signal received at the fifth terminal from the first node; and a fourth comparator having a seventh terminal connected to said first node and an eighth terminal connected to receive said fourth detector signal, said fourth comparator generating a fourth output signal in response to a difference between the fourth detector signal and the reference signal received at the seventh terminal from the first node.

5. The opto-mechanical input device of claim 4 further comprising a microprocessor having a plurality of input terminals, wherein each of the first, second, third and fourth output signals is transmitted to one of said plurality of input terminals.

* * * * *